United States Patent [19]

Davis et al.

[11] Patent Number: 5,859,114
[45] Date of Patent: Jan. 12, 1999

[54] ADHESIVE TAPE COMPOSITIONS AND METHOD FOR COVERING ROOFS

[75] Inventors: James A. Davis, Indianapolis; John W. Fieldhouse, Carmel, both of Ind.

[73] Assignee: Bridgestone/Firestone, Inc., Akron, Ohio

[21] Appl. No.: 626,710

[22] Filed: Apr. 1, 1996

Related U.S. Application Data

[63] Continuation-in-part of Ser. No. 330,041, Oct. 27, 1994, Pat. No. 5,504,136.

[51] Int. Cl.⁶ ................................................. C08L 51/04
[52] U.S. Cl. ....................... 524/490; 524/491; 525/236; 525/240; 525/242
[58] Field of Search ................................. 524/490, 491; 525/236, 240, 242

[56] References Cited

U.S. PATENT DOCUMENTS

| | | | |
|---|---|---|---|
| 3,280,082 | 10/1966 | Natta et al. | 260/80.7 |
| 3,307,690 | 3/1967 | Bond et al. | 206/59 |
| 3,642,728 | 2/1972 | Canter | 260/79.3 R |
| 3,816,371 | 6/1974 | Baldwin et al. | 260/79.5 C |
| 3,819,552 | 6/1974 | Glanville et al. | 260/22 BB |
| 3,852,251 | 12/1974 | Maxey | 260/79.5 B |
| 4,335,026 | 6/1982 | Balinth | 524/271 |
| 4,379,114 | 4/1983 | Fujiki et al. | 264/248 |
| 4,404,056 | 9/1983 | Kekehi et al. | 1569/244.11 |
| 4,426,468 | 1/1984 | Ornum et al. | 523/166 |
| 4,539,344 | 9/1985 | Van Ornum et al. | 523/166 |
| 4,581,092 | 4/1986 | Westley | 156/306.9 |
| 4,588,637 | 5/1986 | Chiu | 428/355 |
| 4,601,935 | 7/1986 | Metcalf et al. | 428/57 |
| 4,645,793 | 2/1987 | Von Hellens et al. | 524/518 |
| 4,657,958 | 4/1987 | Fieldhouse et al. | 524/247 |
| 4,674,996 | 6/1987 | Cantor | 428/343 |
| 4,687,794 | 8/1987 | Huddlestone et al. | 523/351 |
| 4,855,172 | 8/1989 | Chiu | 428/57 |
| 4,919,976 | 4/1990 | Cesare et al. | 427/373 |
| 4,957,968 | 9/1990 | Adur et al. | 525/221 |
| 5,000,361 | 3/1991 | Briddell et al. | 222/575 |
| 5,095,068 | 3/1992 | Chiu | 524/525 |
| 5,216,066 | 6/1993 | Sandstrom et al. | 524/495 |
| 5,242,727 | 9/1993 | Briddell et al. | 428/42 |
| 5,260,111 | 11/1993 | Valaitis et al. | 428/57 |
| 5,563,217 | 10/1996 | Davis et al. | 525/240 |

OTHER PUBLICATIONS

"Ethylene–Propylene Rubbers" by Samuels, Copolymer Rubber & Chemical Corporation, pp. 147–168 (undated).

*Primary Examiner*—Vasu Jagannathan
*Assistant Examiner*—Olga Asinovsky
*Attorney, Agent, or Firm*—Frank J. Troy, Sr.

[57] ABSTRACT

An adhesive tape composition includes a polymer blend comprising at least one ethylene-propylene-diene terpolymer and at least one fully saturated adhesive-enhancing polymer miscible with said at least one ethylene-propylene-diene terpolymer. The tape adhesive composition further includes at least one tackifying additive compatible with said polymer blend and a sulfur and organic accelerator cure package for said polymer blend, the adhesive composition being devoid of butyl rubber which is found in most other adhesive tape compositions. This composition is seen as providing excellent long-term heat aging, weathering resistance, and low temperature properties as compared to adhesive tape compositions containing butyl rubber. Moreover, the adhesive tape composition provides more surface tack, better "quick-grab", and higher green strength as compared to adhesive tape compositions containing 100 percent EPDM rubber. A method is also provided for covering roofs which includes the step of employing the adhesive tape composition.

15 Claims, 1 Drawing Sheet

ADHESIVE TAPE COMPOSITIONS AND METHOD FOR COVERING ROOFS

RELATED APPLICATIONS

This application is a continuation-in-part of U.S. Ser. No. 08/330,041 filed Oct. 27, 1994 U.S. Pat. No. 5,504,136.

TECHNICAL FIELD

The present invention relates generally to adhesive compositions and, more particularly, to pressure sensitive adhesive compositions, typically provided in the form of a preformed tape, for adhering or seaming together the overlapped edges of reinforced or unreinforced rubber sheeting material used for roofing. Specifically, the present invention relates to an adhesive tape composition comprising a polymer blend containing at least one EPDM terpolymer and at least one adhesive-enhancing polymer which is compatible (i.e., miscible) with the EPDM terpolymer or terpolymers. However, the polymer blend is devoid of butyl rubber found in the rubbery component of most other pressure sensitive adhesives. Thus, the adhesive tape composition, which also contains a sulfur/accelerator cure package, provides excellent long-term heat aging, weathering resistance, and low temperature properties as compared to adhesive tape compositions containing butyl rubber. Moreover, the adhesive tape composition may provide more surface tack, smoother extrudates, better "quick-grab", and/or higher green strength compared to adhesive tape compositions containing 100 percent EPDM. A method is also provided for adhering together two layers of rubber sheet material as may be used for covering roofs which includes the step of employing the adhesive tape composition.

BACKGROUND OF THE INVENTION

Polymeric roof sheeting materials such as ethylene-propylene-diene terpolymer (EPDM), butyl rubber (IIR), neoprene, polyvinyl chloride, chlorinated polyethylene, thermoplastic polyolefin rubber and modified bitumen and the like are used as single ply roofing membranes for covering flat roofs typically found on industrial or commercial buildings. Such roofing membranes are customarily large elastomeric sheets which must be seamed or spliced together on the rooftop during installation. However, because these elastomeric (EPDM, neoprene and butyl-based, etc.) roofing membrane compositions are typically cured prior to being installed on a roof, they generally lack the ability to adhere to one another. Further, the seam or area of overlapping of the roof sheeting materials is subject to both short-term and long-term stresses such as those caused by roof movement, heavy winds, freeze-thaw cycles and thermal cycles. Such stresses may manifest themselves in shear forces or peel forces, i.e., the seam peels back under severe stress conditions or may cause a partially open seam (often referred to as a fish-mouth condition) under less severe conditions.

A variety of methods for adhering or seaming the roofing membranes together have been developed over the years. For example, solvent-based adhesives, which typically employ neoprene or butyl-based compounds, have been used to bond roof sheeting materials together by applying, with a brush or other similar means, the liquid or paste-like adhesives directly to the edge areas of the roofing membranes to be joined. However, these adhesives have limited storage life, and are highly toxic and flammable, making them environmentally undesirable. Moreover, application of these adhesives to the roof sheeting membranes is often time-consuming and requires skill in applying the adhesive evenly since streaking and uneven coatings are known to reduce bond strength between the adhesive and the rubber sheeting material.

Alternatively, uncured polymeric tapes containing no vulcanizing agents, i.e., non-curable tapes, have been developed. However, these tapes never cure, even after installation, and therefore, creep under stress is a significant problem associated with the use of these tapes on roofs.

Another type of adhesive composition often used for joining roofing sheet membranes together are those which are initially unvulcanized but which contain curatives so as to be vulcanizable. These adhesives, commonly referred to as rooftop curable adhesives, are typically used in the form of a preformed tape to bond sheet membranes and the like together. However, it is well known that, because the rooftop curable adhesives are uncured when initially installed on a roof, they are recognized as having low initial strengths and are not easily handled. Moreover, some rooftop curable adhesives can take several days or even weeks to achieve good adhesion.

To facilitate adhesion, some of these adhesives may include heat-activated or fast-acting cure systems. Those adhesives with fast-acting cure systems will require additional equipment to blend and extrude the tape mixture to prevent premature curing which can adversely affect the adhesive properties of the composition when applying the adhesive tape to the rooftop membranes. Those adhesives with heat-activated cure systems also will require comparable equipment at the job site to provide the necessary heat and pressure to the tape for joining the sheet membranes together.

Thus, it should be evident that only after an extended period of exposure to high rooftop temperatures or upon application of heat and pressure at the rooftop site is vulcanization achieved to provide the necessary peel and shear strengths required to prevent the seams from sliding or opening. Further, in order to obtain good adhesion, heat and pressure must be applied over a relatively lengthy period of time, thus increasing the time necessary for installation of the sheet membranes on the roof.

Accordingly, attempts have been made in the art to develop adhesive tape compositions which are easier to apply between the area of overlapping of the rubber sheeting membranes, and which provide sufficient seam peel and shear strengths to permit the splice formed by the bonding of the rubber sheeting membranes to withstand and resist heat aging and moisture penetration and other problems such as oxidation, hydrolysis and chemical attack from pooled water, as well as other short-term and long-term stresses as noted hereinabove. Unlike rooftop curable adhesives, these preformed adhesive tapes are at least partially cured prior to being installed upon the roof. Thus, they are far more deformation resistant and easier to handle than the adhesives noted hereinabove. These adhesives are also easier to remove from the release paper upon which they are stored prior to use. Nevertheless, these adhesives have the ability to adhere the roofing sheets together, with minimal pressure. Thus, these preformed adhesive tapes, and the adhesive tapes of the present invention, are often referred to as pressure sensitive adhesives.

In order to provide adhesion and a watertight seal between the tape and the rubber sheeting upon contact, these adhesive tapes typically include a tackifying additive compatible with the rubber employed such as, but not limited to, polybutene. It has been found that polybutene, when used with a butyl rubber composition, provides an adhesive tape having sufficient surface tack and "quick-grab" as well as adequate green strength for use in adhering roofing sheet membranes together.

Accordingly, heretofore, most pressure sensitive adhesives used to join rubber roofing membranes together included a rubbery polymer composition based on butyl rubber or butyl rubber blended with various amounts of an EPDM terpolymer. The cured adhesive also included a cure package, typically based upon the use of a sulfur, peroxide or quinoid crosslinking system.

For example, Chiu U.S. Pat. Nos. 4,588,637, 4,855,172 and 5,095,068 disclose adhesive compositions, prepared in the form of a cured adhesive tape, which comprises butyl rubber-based compositions made by compounding a butyl rubber, a curing agent for the butyl rubber, carbon black, and a compatible tackifying additive.

Metcalf et al. U.S. Pat. No. 4,601,935 discloses a seaming tape comprising a carbon black-reinforced, compounded, lightly cured blend of a butyl rubber and a polyisobutylene. The seaming tape serves to adhere the primer-coated seam edges of EPDM membranes together.

Briddell et al. U.S. Pat. No. 5,242,727 discloses a cured adhesive tape composition which includes substantially equal amounts by weight of a rubbery polymer comprising a blend of EPDM, a halogenated butyl rubber or a halogenated isobutylene-based copolymer and polyisobutylene, a compatible tackifying additive and a compatible accelerator/cure package for the rubbery polymer blend.

It is clear that all of the above adhesive tape compositions include butyl rubber (IIR). The term "butyl rubber" as used herein is intended to include copolymers of isobutylene and isoprene as well as other rubbery copolymers comprising at least 50 percent by weight of an isoolefin having 4 or more carbon atoms and 50 percent or less by weight of an open chain conjugated diolefin having from 4 to 8 carbon atoms. "Butyl rubber" is intended to also include halogenated butyl rubber, such as chlorobutyl or bromobutyl rubber, as well as those types of butyl rubber in which conjugated diene functionality has been added in the linear backbone at the diolefin units, such as more particularly described in U.S. Pat. No. 3,816,371.

Butyl rubber is used in these adhesive tape compositions to enhance surface tack required for joining together two overlapped single-ply EPDM roofing membranes. However, butyl rubber tape compositions do not provide as good long-term aging and weather resistance properties as tape compositions based upon ethylene-propylene-diene terpolymers (EPDM). Moreover, EPDM-based tape compositions exhibit good low temperature properties as compared to butyl-based tape compositions and would clearly be more compatible with EPDM membranes and flashing materials.

Some patents have recognized the use of EPDM in tape compositions. For example, Fujuki et al. U.S. Pat. No. 4,379,114 discloses a curable tape which may include a rooftop curable EPDM rubber, butyl rubber, or a blend thereof. The curable tape may further include a vulcanizing agent and accelerator, a softening agent, and other ingredients such as fillers and the like.

Kakehi et al. U.S. Pat. No. 4,404,056 discloses a cold-vulcanizable adhesive tape having a Mooney viscosity of from about 5 to 25 and which includes a rubbery polymer comprising EPDM, butyl rubber or a blend thereof, as well as a vulcanizing agent, a vulcanization accelerator, an adhesive (tackifying) agent and a softening agent.

Westley U.S. Pat. No. 4,581,092 discloses a preformed adhesive tape composition comprising EPDM or halogenated butyl rubbers, at least one polyisocyanate, a low-temperature and a high-temperature tackifying additive, and at least one curing agent.

It will be appreciated, however, that the rubbery components of the adhesive tapes noted hereinabove comprise essentially 100 percent EPDM rubber, 100 percent butyl rubber or a blend of EPDM and butyl rubber. As noted hereinabove, butyl rubbers do not provide as good long-term aging and weather resistance properties as tape compositions based upon ethylene-propylene-diene terpolymers (EPDM). However, 100 percent EPDM compositions do not have very good surface tack, initial strength or "quick-grab". "Quick-grab" refers to the characteristic of the adhesive tape composition to develop immediate adhesion when placed in direct contact with the surface of cured sheets of polymeric roof sheeting material.

Other patents have taught the use of modified or very high molecular weight EPDM terpolymers to provide novel compositions having particularly desirable characteristics. For example, Balinth U.S. Pat. No. 4,335,026 discloses a pressure-sensitive adhesive composition having high shear and low peel resistance which comprises an elastomeric blend of natural rubber (polyisoprene) and EPDM, a liquid plasticizer, a reinforcing filler, a solid tackifier, and a stabilizer.

Fieldhouse et al U.S. Pat. No. 4,657,958 discloses adhesive compositions containing a neutralized sulfonated EPDM terpolymer. This modified EPDM composition, however, further requires the use of an organic hydrocarbon solvent such as naphtha.

Also, Von Hellens et al. U.S. Pat. No. 4,645,793 discloses elastomeric compositions having improved adhesive characteristics, the compositions containing specific EPDMs having high unsaturation and very high molecular weights. These compositions are disclosed as being suitable for pneumatic tire treads and sidewalls, not rooftops.

Thus, it should be clear that the EPDM-based adhesive compositions described hereinabove suffer from a significant disadvantage which materially limits their usefulness as pressure sensitive adhesives for bonding cured, elastomeric roof sheeting membranes together. While attempts may have been made heretofore to provide adhesive tape compositions which improve some of the properties in either 100 percent EPDM rubber-based or butyl rubber-based adhesive tape compositions, the need still exists in the art for an effective EPDM rubber-based adhesive tape composition and method of application for use in adhering together rubber sheets and for covering roofs which provides easy application, excellent peel and/or shear strength, excellent initial adhesive strength and "quick-grab" and better surface tack, and which maintains long-term heat aging and weather resistance.

SUMMARY OF INVENTION

It is therefore, an object of the present invention to provide an EPDM-based adhesive tape composition which is particularly adaptable for use as an adhesive tape for joining together reinforced or unreinforced rubber sheeting material for covering roofs.

It is another object of the present invention to provide an adhesive tape composition, as above, which exhibits excellent peel adhesion as well as dead-load shear strength.

It is yet another object of the present invention to provide an adhesive tape composition, as above, which has sufficient surface tack, and excellent initial strength and "quick-grab" for use in seaming roof sheeting membranes together.

It is still another object of the present invention to provide an adhesive tape composition, as above, which displays excellent long-term heat aging and weathering resistance.

It is a further object of the present invention to provide an adhesive tape composition, as above, which is compatible with EPDM roof sheeting and flashing materials.

It is yet a further object of the present invention to provide an adhesive tape, as above, which can be used to form a laminate seam of variable width between two layers of elastomeric roof sheeting.

At least one or more of the foregoing objects, together with the advantages thereof over the known art relating to adhesive tape compositions, which shall become apparent from the specification which follows, are accomplished by the invention as hereinafter described and claimed.

In general, the present invention provides an adhesive tape composition for adhering together the overlapped edges of two layers of rubber sheeting, the adhesive tape comprising a polymer blend comprising at least one ethylene-propylene-diene terpolymer and at least one fully saturated adhesive-enhancing polymer miscible with the at least one ethylene-propylene-diene terpolymer; at least one tackifying additive compatible with the polymer blend; and a cure package containing a curing agent and at least one accelerator, for the polymer blend, the adhesive composition being devoid of butyl rubber.

The present invention also provides an adhesive tape composition for adhering together layers of polymeric sheet material, the adhesive tape composition comprising a polymer blend comprising from about 50 to about 90 parts by weight of at least one ethylene-propylene-diene terpolymer; and from about 10 to about 50 parts by weight of at least one fully saturated adhesive-enhancing polymer miscible with the at least one ethylene-propylene-diene terpolymer, to total 100 parts by weight of the polymer blend; from about 50 to about 250 parts by weight of at least one compatible tackifying additive, per 100 parts by weight of the polymer blend; and from about 1.25 to about 10 parts by weight of a cure package containing a curing agent and at least one accelerator for the polymer blend, per 100 parts by weight of the polymer blend.

The present invention further includes a laminate seam of flat rubber sheet material for roofing comprising two layers of sheet material, one of the layers at least partially overlapping the other layer; and an adhesive composition in the form of a pressure sensitive adhesive tape interposed between the area of overlapping of the layers to form a seam, the adhesive composition comprising a polymer blend of at least one EPDM rubber and at least one fully saturated adhesive-enhancing polymer miscible with the at least one ethylene-propylene-diene terpolymer; at least one compatible tackifying additive; and a cure package containing a curing agent and at least one accelerator, for the polymer blend, the adhesive composition being devoid of butyl rubber.

The present invention further provides a method for adhering together two layers of reinforced or unreinforced rubber sheet material having edge areas, comprising the steps of applying an adhesive tape composition to the edge area of one of the layers of rubber sheet material, the adhesive tape composition including a polymer blend of at least one EPDM rubber and at least one fully saturated adhesive-enhancing polymer miscible with the at least one ethylene-propylene-diene terpolymer; at least one compatible tackifying additive; and a cure package containing a curing agent and at least one accelerator, for the polymer blend, the adhesive tape composition being devoid of butyl rubber; applying the edge area of the other layer of rubber sheet material to the opposite side of the adhesive tape composition, thereby overlapping the edge areas of the layers of rubber sheet material; and applying pressure to the overlapped edge areas to form a seam; the sheet material having a seam peel adhesion value of at least about 2 pounds/inch and a seam shear adhesion value of at least about 10 pounds/square inch, after aging for at least 24 hours and testing at 23° C.

PREFERRED EMBODIMENT FOR CARRYING OUT THE INVENTION

Figure 1:
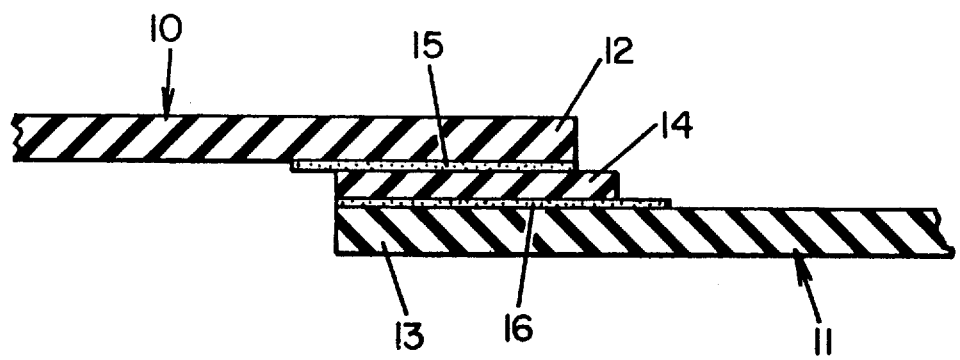
FIG. 1 is a vertical cross-section of two overlapping, single-ply EPDM roofing membranes, joined together at the primed seam area by an adhesive tape composition according to the present invention.

With reference to the drawings, FIG. 1 shows two layers of flat, roofing sheet membranes, 10 and 11, depicted with the edge area 12 of membrane 10 being overlapped by the edge area 13 of membrane 11 to form a seam. Interposed between these overlapped edges 12 and 13 is an adhesive tape 14 joining together the layers of roofing membranes to form a preferably watertight seam. Preferably, each edge area 12 and 13 contains a primer, 15 and 16, respectively, deposited from solution and air-dried on the edge area surface of each membrane to enhance bond formation.

Figure 2:
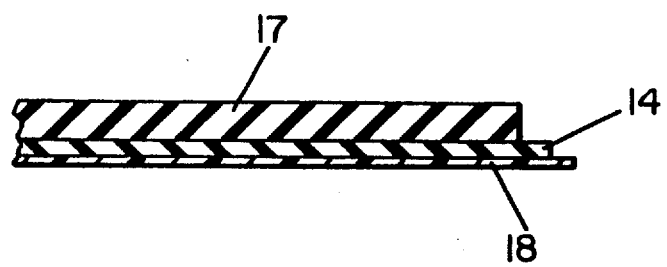
FIG. 2 is a vertical cross-section of a rubber sheet which has been mated with the adhesive tape composition to form a laminate according to the present invention.

FIG. 2 depicts a clean, uncured or cured, flat rubber sheet or flashing 17 to which the adhesive tape composition 14 is joined to form a laminate which may be used as a cover strip to cover the batten bar during the installation of a new roof or to repair an existing roof. A release paper 18 may be joined to the other tacky surface of the tape to prevent exposure of the surface to dust and the like prior to installation on the roof.

The adhesive tape 14 of the present invention is preferably a preformed, at least partially cured, tacky composition which possesses excellent initial strength, due at least in part to the cured nature of the composition, and is easy to apply to the flat rubber sheet membranes at the job site to adhere the membranes together. The tape possesses good storage stability, i.e., good shelf-life, and excellent "quick-grab" and has sufficient surface tack for rooftop installation.

More particularly, the adhesive tape composition includes a polymer blend containing at least one EPDM terpolymer and at least one adhesive-enhancing polymer compatible and otherwise miscible with the EPDM terpolymer or terpolymers to enhance adhesion as detailed hereinbelow. Such an EPDM-based adhesive composition is seen as preferred over butyl rubber-based adhesive compositions in that the preferred composition possesses excellent heat aging and weathering resistance as compared to butyl rubber compositions. However, due to the addition of the adhesive-enhancing polymers in the blend, the tape compositions are tackier, possess better "quick-grab" and, in some instances, possess higher green strength than compositions based upon 100 percent EPDM.

As noted, the polymer blend used in the present invention includes at least one EPDM rubber. The term EPDM is used in the sense of its definition as found in ASTM-D-1418-85 and is intended to mean a terpolymer of ethylene, propylene and a diene monomer with the residual unsaturation portion of the diene in the side chain. Illustrative methods for preparing such terpolymers are found in U.S. Pat. No. 3,280,082, the disclosure of which is incorporated herein by reference.

Where only one EPDM terpolymer is utilized in the present invention, the preferred EPDM terpolymer generally has a weight average molecular weight of less than about 350,000, and even more preferably, has a weight average molecular weight of less than about 275,000. The EPDM terpolymer also generally has a relatively low ethylene content of from about 45 percent to about 70 percent by weight and a polymer viscosity of about 10 to about 55 Mooney units ($ML/_4$ at 125° C.), as well as a relatively low glass transition temperature (Tg) of from about −40° C. to about −60° C., and more preferably from about −45° C. to about −55° C. However, it will be appreciated that any EPDM as defined hereinabove which is suitable for use under the conditions of the present invention may be used.

The diene monomer utilized in forming the preferred EPDM terpolymer is preferably a non-conjugated diene. The diene component of the terpolymer can be any of those commercially available, including but not limited to ethylidene norbornene, 1–4-hexadiene or dicyclopentadiene, or mixtures thereof, with ethylidene norbornene (ENB) being preferred. Other illustrative examples of non-conjugated dienes which may be employed are alkyldicyclopentadiene, 1,4-pentadiene, 1,5-hexadiene, 1,4-heptadiene, 2-methyl-1, 5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. Moreover, the preferred EPDM terpolymer has from about 2 to about 10 percent by weight unsaturation. The preferred EPDM terpolymer may also have a specific gravity of about 0.86 at 23° C.

In addition, although any unmodified EPDM terpolymer as discussed above can be used in the blend, the preferred EPDM terpolymer is amorphous or non-crystalline so as to provide for improved processability, especially during extrusion of the adhesive tape composition. Amorphous EPDM terpolymers are defined as those EPDMs having less than two percent by weight crystallinity as determined by DSC techniques and are considered to have more surface tack than crystalline EPDM terpolymers. In instances where more than one EPDM is employed in the polymer blend of the present invention, major amounts (i.e., more than 50 percent) of an amorphous EPDM and minor amounts (i.e., less than 50 percent) of a crystalline EPDM are preferably used.

Particularly useful and preferred in preparing the EPDM portion of the polymer blend for use in the adhesive tape composition are EPDM terpolymers commercially available from DSM Copolymer of Baton Rouge, La., under the trademark Keltan®; Exxon Chemical Company of Houston, Tex., under the trademark Vistalon®; Uniroyal Chemical Company of Naugatuck, Conn., under the trademark Royalene®; Miles Inc. (Polysar Rubber Division) under the trademark Polysar EPDM®; and E.I. DuPont de Nemours of Wilmington, Del., under the trademark Nordel®. Such EPDMs are sulfur vulcanizable and meet the various chemical and physical requirements noted hereinabove for the EPDM terpolymers.

Some particularly suitable sulfur vulcanizable EPDM terpolymers which can be used in this invention include those which have a weight average molecular weight of at least about 150,000, and less than about 350,000. Some examples of such EPDM rubbers include Vistalon® 7500, Vistalon® 3708, Vistalon® 4608, Vistalon® 5600, Vistalon® 6505, Royalene® 505, Royalene® 535, Keltan® 4506, Keltan® 4906, Keltan® 5206, Polysar EPDM® 826X, Nordel® 1145, Nordel® 1320, and Nordel® 1660. The major function of these "high" molecular weight EPDM rubbers is to impart needed green strength to the tape composition. Sufficient green strength is needed during extrusion of the tape composition as well as during installation of the tape in a rooftop situation.

An example of a particularly preferred EPDM is Keltan 4906, a fast curing polymer having about 8 to 9 percent unsaturation. Keltan 4906 has a number average molecular weight and a weight average molecular weight of about 77,000 and 222,000, respectively. It has a Mooney viscosity ($ML/_4$ at 125° C.) of about 40, an ethylene content of about 55 to 65 weight percent, and a volatile content of 0.75 weight percent maximum.

While the preferred embodiment incorporates only one EPDM into the polymer blend of the present invention, it will be appreciated that more than one EPDM terpolymer can be employed. Where two or more EPDMs are utilized, it is desired that each EPDM terpolymer have a weight average molecular weight of less than 350,000, and more preferably, less than about 275,000. Furthermore, it will be appreciated that, where more than one EPDM is used, it is preferred that the EPDMs have differing characteristics and/or properties so as to improve the adhesive tape composition. Typically, the differences in the characteristics and/or properties will result from a change in the molecular weight of the EPDM, but this is not necessarily always the case. Thus, different EPDMs having substantially the same weight average molecular weight could be used in the present invention. However, it will be understood that EPDM terpolymers identified as the same by their manufacture are to be considered one EPDM for the purposes of this invention, even though the weight average molecular weight of the particular EPDMs might vary slightly due to batch preparation conditions and the like. Where more than one EPDM is employed, the EPDMs will typically vary in molecular weight and also in some other property, e.g., ethylene content, polymer viscosity, glass transition temperature, etc., or characteristic, e.g., improved "quick-grab", increased tack, improved green strength, etc.

Thus, other useful vulcanizable EPDM rubbers having a weight average molecular weight of less than about 350,000 are also considered suitable. For example, those EPDMs having a weight average molecular weight of less than 150,000 or even less than 50,000 might also be used. Examples of EPDMs having a weight average molecular weight ranging from about 50,000 to about 150,000, include Royalene® 552, Royalene® 501, Royalene® 521, Keltan® 378. These polymers may further enhance surface tack and provide additional green strength as well as impart smoothness to the surface of the tape extrudate. Examples of EPDMs having a weight average molecular weight ranging from about 10,000 to about 50,000 include Trilene® 67, Trilene® 68, Keltan® 4200 and Keltan® 1446A. These EPDM terpolymers have a lower weight average molecular weight than those EPDMs identified above and, therefore, may serve to increase surface tack, may act as a processing aid, and/or may serve as a compatibilizing agent to facilitate incorporation of the liquid polybutene which may be added as a tackifying agent. They are recommended as a replacement for conventional plasticizers in products where minimizing volatility and extraction are critical.

It will be appreciated that the present invention does not limit the number of EPDMs employed to one of the particular groups however. Some of the properties referred to for one group of EPDMs listed above may equally apply to some of the EPDMs in another of the groups. Furthermore, while the EPDMs designated in the first group listed above are most preferred, the present invention do not necessarily limit the use of a single EPDM from that group, the selection of an EPDM being based upon the characteristics desired and it compatibility with the rest of the ingredients, i.e., the adhesive-enhancing polymer, in the polymer blend.

The polymer blend also includes at least one adhesive-enhancing polymer. By the term "adhesive-enhancing" it is meant that these polymers provide the tape compositions with more surface tack, better "quick-grab", and wet into the surface of the cured membrane which is essential during rooftop installation. In addition, some of these polymers may provide the tape composition with higher green strength and improved long-term aging performance compared to tape compositions which do not include these polymers. Sufficient green strength is essential during the formation of seams with an adhesive tape composition, especially when the seams are being formed at elevated temperatures.

As noted, the adhesive-enhancing polymers of the present invention must be compatible or miscible with the ethylene-propylene-diene terpolymer or terpolymers employed. In order to determine compatibility or miscibility with EPDM, a solubility test was conducted to determine whether or not the tested polymer was at least partially soluble in "hot" and "cold" cyclohexane. More specifically, about 5 weight percent of each polymer to be tested was placed into cyclohexane at a temperature of about 70° C. (i.e., "hot") and separately into cyclohexane at a temperature of about 25° C. (i.e., "cold"), and stirred. It was then determined whether the particular polymer tested was soluble in cyclohexane or not. It is well known that cyclohexane has a solubility parameter such that it will dissolve EPDM. Accordingly, those tested polymers which dissolve in cyclohexane are considered miscible with EPDM.

In addition to being miscible with EPDM, the adhesive-enhancing polymers are also fully saturated. That is, they contain no reactive double bonds. It will be appreciated that, upon review of some the specific polymers set forth below, some of the polymers may have double bonds, but those double bonds are not reactive with sulfur or otherwise enable the polymer to be cured and, therefore, are considered to be fully saturated. In essence, the adhesive-enhancing polymers of the present invention are essentially high molecular weight, saturated polymers.

Some particularly suitable adhesive-enhancing polymers used to practice the present invention include, for example, ethylene-containing copolymers and terpolymers, such as ethylene-vinyl acetate (EVA) copolymers, ethylene-vinyl chloride copolymers, ethylene-octene copolymers, and ethylene-butene copolymers, as well as propylene-butene-ethylene terpolymers. Tape compositions comprising a polymer blend of EPDM and these ethylene-containing polymers are believed to provided excellent heat aging and weathering resistance as compared to tape compositions containing 100 percent EPDM.

Some examples of ethylene-vinyl acetate (EVA) copolymers include those commercially available from E.I. du Pont & Nemours, under the registered trademark Elvax®, from Miles Inc. under the registered trademark Levapren® or from Quantum under the trademark Ultrathene®. More particularly, these EVA copolymers include Elvax® 250, Elvax® 260, Elvax® 265, Levapren® 400, Levapren® 452, Levapren® 700 and Ultrathene® EY902. These copolymers have an ethylene content ranging from about 30 to about 72 weight percent and the Levapren® products have a Mooney viscosity ($ML_4$ at 100° C.) of between about 11 and 27. The EVA copolymers also have a specific gravity ranging from about 0.96 to about 1.08.

Examples of ethylene-octene copolymers include Engage® CL8001 and Engage® EG8200, both of which are commercially available from Dow Plastics. These copolymers have an ethylene content of about 75–76 and a Mooney viscosity ($ML_4$ at 121° C.) of about 35.

Examples of ethylene-butene copolymers include Eastoflex® D-139, commercially available from Eastman Chemical; Exact® 4038, commercially available from Exxon Chemical; and GERS-1085NT, commercially available from Union Carbide. The first copolymer, Eastoflex® D-139, is noted as having a glass transition temperature of about −25° C., while the latter two copolymers are noted to have an ethylene content of about 75 and 82 weight percent, respectively.

It will be appreciated that the present invention is devoid of ethylene-propylene copolymers, however, since such copolymers are at least partly the subject of U.S. Ser. No. 08/330,041, the parent of the subject application and have already been shown to improve the various characteristics of the adhesive tape composition. The present invention may also be devoid of polybutadiene and polyisoprene for the same reasons.

An example of a propylene-butene-ethylene terpolymer suitable for use in the present invention includes Eastoflex® D-147. This terpolymer has a glass transition temperature of about −24° C.

With respect to the ethylene-containing copolymers and terpolymers, any ethylene-containing copolymer or terpolymer capable of imparting the desired characteristics to the tape composition, other than ethylene-propylene copolymers, can be used in the polymer blend, although ethylene-vinyl acetate and ethylene-butene are preferred.

Other suitable adhesive-enhancing polymers include hydrogenated styrene-containing copolymers such as styrene-butadiene-styrene copolymers and hydrogenated styrene-isoprene-styrene copolymers. An example of a hydrogenated styrene-butadiene-styrene (block) copolymer is commercially available from Shell Chemical under the trademark Kraton G-1652. This copolymer has a styrene to butadiene content of about 29 to 71.

Still other adhesive-enhancing polymers include t-polyoctenamer rubber and polyisobutylene. An example of a t-polyoctenamer rubber is a mixture of cis- and trans-cyclooctene, available from Huls under the trademark Vestenamer 8012. This compound includes about 20 percent of the cis- polymer and about 80 percent of the trans- polymer, has a glass transition temperature of about −65° C. and has a Mooney viscosity ($ML_4$ at 100° C.) of less than 10. Among the preferred polyisobutylenes is Vistanex L-80 and Vistanex LM-LH, commercially available from Exxon Chemical.

The polymer blends to be employed in the adhesive composition generally includes major amounts of EPDM and only minor amounts of the adhesive-enhancing polymer (s). In fact, the polymer blend typically includes at least 50 parts by weight EPDM and up to 50 parts by weight of at least one adhesive-enhancing polymer, at least 60 parts by weight EPDM and a maximum of about 40 parts by weight adhesive-enhancing polymer being preferred, and from about 80 parts by weight EPDM and 20 parts by weight adhesive-enhancing polymer being even more preferred, the polymer blend totaling 100 parts by weight. It will be appreciated that less than 10 parts by weight of at least one of the adhesive-enhancing polymers can be used, but does not provide optimum tape properties. When more than one EPDM is employed, it is preferred that substantially equal amounts, by weight, of each EPDM rubber be employed or that the EPDM having the higher molecular weight to employed in a greater amount than any other EPDM.

The composition employed to form the adhesive tape of the present invention is generally comprised of a polymer blend comprising at least one EPDM and at least one fully saturated adhesive-enhancing polymer miscible with the at least one ethylene-propylene-diene terpolymer, this polymer blend being discussed hereinabove, and further includes liquid and solid tackifying additives, and fillers as well as other conventional components including curatives or vulcanizing agents, as discussed hereinbelow. The amounts of tackifying additives, processing materials, fillers, curing agents, and other additives used in the tape composition will be expressed hereinafter as parts by weight per 100 parts by weight of the polymer blend contained in the composition and will be designated "phr".

The adhesive tape compositions of the present invention typically are compounded with one or more known liquid, semi-solid, or solid tackifying additives. These tackifying additives are generally employed to promote good tackiness in the adhesive composition. Generally, any tackifying additive or combination of tackifying additives which are compatible with the polymer blend may be used. Examples of suitable tackifying additives include polybutenes, paraffinic oils, petrolatum, phthalates, and various resins including but not necessarily limited to polyterpenes, terpene-phenolic, modified rosin and rosin esters, and hydrocarbon and phenolic resins. Resin is intended herein to refer to a variety of hard, brittle, solid, semi-solid or liquid organic substances. Resins may be either natural, i.e., rosin, or synthetic, i.e., coumarone-indene and phenolformaldehyde. Rosin is basically a residue obtained from extracting pine wood chips with naphtha and distilling off the volatile fraction. Preferred tackifying additives include polybutene and phenolic resins. Hydrocarbon resins may also have utility in this invention.

Particularly useful tackifying additives used to practice this invention are the liquid polybutenes. Polybutenes are a series of colorless isobutylene-butene copolymers composed predominantly of high molecular weight monoolefins (95–100 percent), with the balance being isoparaffins. They are chemically stable, permanently-fluid liquids with a moderate to high viscosity, and resistant to oxidation by heat and light. The amount of liquid polybutene which can be utilized can vary from about 50 to as high as about 250 phr, with a range of from about 90 to about 190 phr being most preferred. A preferred polybutene is Parapol® 1300, a viscous liquid made from isobutylene and butene monomers and commercially available from Exxon Chemical Company. Parapol® 1300 is a colorless liquid which imparts increased tackiness to a variety of materials. This polybutene has an average molecular weight of about 1300, a flash point of about 225° C., a glass transition temperature (Tg) of about −69° C. and a refractive index at 20° C. of about 1.5. Other liquid polybutenes used in the tape composition of the present invention may include Parapol® 450, 700, 950, 2200 and 2500.

Other polybutenes other than those noted above which may be used in the present invention include those commercially available from Amoco Chemical Corporation under the registered trademark Indopol®. Some of these liquid polybutenes which may be used in the tape composition of the present invention include Indopol® H-100, H-300, H-1500, and H-1900. One preferred polybutene from this group is Indopol® H-300, which has a weight average molecular weight of about 1290, a pour point of about 2° C., a glass transition temperature (Tg) of about −66.9° C. and a specific gravity of about 0.89 at 23° C.

Besides polybutenes, tackifying phenolic resins such as those commercially available from PMC, Inc. under the registered trademark Dyphene® may be employed. One preferred phenolic resin from this group is Dyphene® 8318, an oil-soluble, non-heat-reactive alkyl phenolic novolak resin that imparts excellent initial tack and tack retention to the polymeric rubber compounds. The clear, yellow to amber resin has a softening point of about 85° C. to 105° C. and a specific gravity of about 1.0 to 1.05.

Other suitable tackifying additives include low molecular weight, hydrogenated, petroleum-derived hydrocarbon resins commercially available from Exxon Chemical Company under the registered trademark Escorez®. Suitable tackifying resin additives include Escorez® 1304, Escorez® 1315, Escorez® 1504, Escorez® 5300, Escorez® 5320, and Escorez® 5380. These resins are characterized as being thermoplastic, hydrogenated aliphatic hydrocarbons having softening points of about 85° C. to 125° C., and weight average molecular weights ranging from about 360 to 2570.

Still other noteworthy tackifying resins include Piccopale® 100 resin (a polyterpene resin) and Piccotac® B resin, both commercially available from Hercules Incorporated. Piccopale® 100 is a pale yellow, thermoplastic resin, having a softening point of about 100° C., an acid number of <1, and a specific gravity of about 0.95 at 23° C. Piccotac® B resin is a pale yellow, thermoplastic resin, having a softening point of about 98° C., an acid number of <1, and a specific gravity of about 0.95 at 23° C. Betaprene® H-100 resin, a pale yellow, hard, friable aliphatic hydrocarbon resin having a softening point of about 100° C., a specific gravity of 0.92 at 23° C. and commercially available from Arizona Chemical Company is also available as a tackifying resin. In addition, other petroleum-derived hydrocarbon resins which impart excellent heat stability in pressure sensitive adhesive tape compositions include Eastotac® H-100 and H-115 which have softening points ranging from about 100° C. to about 115° C. and specific gravities of about 1.04 at 23° C., both of these resins being commercially available from Harwick Chemical.

Other particularly useful naturally occurring resins which can be incorporated in the tape composition to impart tack and improve heat stability include Foral® 85, a glycerol ester of hydrogenated rosin and Foral® 105, a pentaerythritol ester of hydrogenated rosin, both commercially available from Hercules Incorporated. Some additional naturally occurring resins which are chemically based on esters of pentaerythritol include Pentalyn® A and Pentalyn® H which may be used to enhance tack, are both commercially available from Hercules Incorporated.

Other particularly useful aliphatic hydrocarbon resins are the highly viscous liquid petroleum-derived resins available under the trademark Escorez® 2520. Such a resin has a softening point of about 20° C., a molecular weight of 380, and a specific gravity of about 1.02 at 15.5° C. This resin serves as a processing aid as well as impart additional tack to the surface of the tape extrudate.

The amount of tackifying additive employed depends essentially upon the level of tack desired. It will be understood that the specific tackifying additives which can be combined and the amount of each tackifying additive which can be employed to achieve the desired level of tack can be readily determined by those skilled in the art using reasonable and routine experimentation. Specifically, tackifying additives usually are employed in amounts that are effective to promote good adhesion with the roofing sheet membranes. Such amounts generally may range from about 50 phr to about 250 phr, with about 90 to about 190 phr being more preferred.

In the preferred embodiment, a tape composition of the present invention includes polybutene and a phenolic resin. In such a tape composition, from about 90 to about 175 parts by weight of polybutene may be used and from about 10 to about 30 parts by weight of phenolic resin may be used.

Suitable fillers for use with this invention include reinforcing and non-reinforcing materials, and mixtures thereof, as are customarily added to rubber. Such fillers are typically utilized in conventional amounts ranging from about 5 to about 35 phr. Examples include materials as carbon black, finely ground coal, calcium carbonate, clay, silica, magnesium silicate, cryogenically ground rubber, and the like. The preferred fillers employed carbon black and magnesium silicate.

Carbon black may be used in amount ranging from about 4 to about 25 phr, and preferably in an amount of from about 4 to about 10 phr. Generally, any conventional carbon black used in compounding rubber-based adhesive formulations is suitable for use in the present invention, although for this invention, furnace blacks including FEF (fine-extrusion furnace), SRF (semi-reinforcing furnace) and GPF (general-purpose furnace) are preferred, with GPF black being most preferred. Also, small amounts of a reinforcing carbon black, i.e., HAF (high-abrasion furnace) may have utility in this invention.

Magnesium silicate is commercially available under the trademark Microtalc, and is preferably used in an amount of from about 10 to about 30 phr, with about 20 phr being most preferred.

The adhesive composition also includes a cure package containing a curing agent and at least one organic accelerator in order to effect at least partial crosslinking or curing of the adhesive composition prior to its use as a seam tape. The composition is typically heat aged for a period of time to insure crosslinking. The polymer blend may be at least partially cured using any of several well-known curing agents, but preferably the cure package of the present invention includes sulfur and sulfur-containing cure systems. By "partially cured", it is meant that the composition is at least somewhat crosslinked to provide needed strength and handling performance to the composition during application of the seam tape in rooftop situations. More specifically, the composition is preferably cured with an amount of curing agent which is effective to leave residual olefinic unsaturation after heating the tape composition at a temperature of about 50° C. to 150° C. for about 2 to 48 hours. It is to be expressly distinguished from those "rooftop curable" adhesive compositions which are vulcanizable, but have not been vulcanized. Generally, the sulfur/accelerator cure package employed in the adhesive composition is provided in amounts ranging from about 1.25 to about 10 phr.

Preferably, a sulfur cure package is employed which includes sulfur and sulfur-containing cure systems. The sulfur and sulfur-containing cure systems used in the present invention typically include one or more sulfur cure accelerators and/or activators. Suitable accelerators commonly employed include, for example, thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazolesulfenamide, N,N-diisopropyl-2-benzothiazolesulfenamide, N-tertbutyl-2-benzothiazole sulfenamide (TBBS) and the like; 2-mercaptoimidazoline, N,N-diphenylguanadine, N,N-di-(2-methylphenyl)-guanidine, 2-mercaptobenzothiazole, 2-(morpholinodi-thio) benzothiazole disulfide, zinc 2-mercaptobenzothiazole and the like; dithiocarbamates such as tellurium diethyidithiocarbamate, copper dimethyidithiocarbamate, bismuth dimethyldithiocarbamate, cadmium diethyldithiocarbamate, lead dimethyldithiocarbamate, zinc diethyidithiocarbamate and zinc dimethyidithiocarbamate.

It should be appreciated that the foregoing list is not exclusive, and that other vulcanizing agents known in the art to be effective in the curing of EPDM terpolymers employed in the polymer blend may also be utilized. For a list of additional vulcanizing agents, see *The Vanderbilt Rubber Handbook,* RT Vanderbilt Co., Norwalk Conn. 06855 (1990). It should also be understood that these sulfur donor-type accelerators may be used in place of the elemental sulfur or in conjunction therewith. Suitable amounts of sulfur to be used in the cure package can be readily determined by those skilled in the art, and generally range from about 0.25 to 2 phr, while the amount of accelerator can also be readily determined by those skilled in the art and generally range from about 1 to about 8 phr, in total.

Accelerators generally require a metal oxide, i.e., zinc oxide for cure activation in most all types of rubbers. Zinc oxide is almost always the metal oxide of choice because of its effectiveness and lack of toxicity. The amount of zinc oxide may vary, but about 1 to about 10 parts in the formulation have been found to give the desired effect. Also, in order to initiate the vulcanization process, a small amount (generally about 1 to 2 parts by weight) of stearic acid is present in the tape composition. Using heat, both zinc oxide and stearic acid act as cure activators in the presence of sulfur, one or more accelerators and unsaturated rubber to help promote the formation of sulfur crosslinks during the vulcanization process. Some of the initial chemical reactions which take place during the early stages of the vulcanization process include reacting zinc oxide with stearic acid to form salts of even greater vulcanization activity. Zinc oxide itself acts as a cure activator or vulcanization promoter, speeding the rate of reaction of elemental sulfur with the unsaturation in the diene portion of the ethylene-propylene rubber. In addition to its use as a curing component, the sulfur component of the present invention may also be used in conjunction with zinc oxide to improve the heat aging resistance of the composition. Still further, other suitable cure activators or, more specifically, oxidants for the sulfur-curing system, include tetrachlorobenzoquinone commercially available from Uniroyal Chemical Co. under the tradename Vulklor.

Other ingredients may also be included in the adhesive composition. For example, additional conventional rubber compounding additives such as antioxidants, antiozonants, flame retardants and the like may be included in conventional amounts typically ranging from about 0.25 to about 4 phr.

The adhesive composition can be initially admixed by conventional means using conventional rubber compounding equipment such as a Brabender mixer, a Banbury mixer, a Sigma-blade mixer, a two-roll mill, an extruder and/or any other mixers and the like which are suitable for compounding the ingredients of the composition. The ingredients are admixed (except for curing agent e.g., sulfur, and accelerators) at temperatures ranging from about 50° C. to about 150° C. to form a masterbatch. In the preferred embodiment, the polybutene (or tackifying resin) is typically added near the end of the mixing process, and then, the sulfur and accelerator are added at the end of the mixing process, after formation of the masterbatch, at lower temperatures (preferably below 110° C.) than previously employed to prevent premature crosslinking of the polymers in the adhesive tape composition.

The adhesive composition can then be formed into a tape using conventional mixing extruder or other suitable extrusion equipment. The tape is generally in the form of a continuous strip having a preferred thickness of from 20 to 60 mils, however, tapes having a thickness of up to 250 mils may be useful. The desired width of the tape can range from about 1 to 5 inches, however, tapes having a width of as wide as 18 inches may have utility in this invention.

The adhesive compositions of the invention, after being extruded or otherwise preformed into suitable tape extrudates, are heat aged to effect partial crosslinking thereof. Heat aging is generally achieved by exposing the composition to elevated temperatures for a time sufficient to obtain the desired partial crosslinking, wherein the polymeric elastomer contains residual unsaturation after the curative has been consumed. Typically, the desired partial crosslinking can be achieved by heating the preferred adhesive tape compositions of the invention to temperatures ranging from about 50° C. to about 150° C. for periods of time ranging from about 2 hours to about 48 hours, and more preferably to temperatures of from about 68° C. to about 150° C. for periods of time ranging from about 8 hours to about 36 hours. For convenience, the tape is typically provided with a conventional release paper and wound into a roll for transportation and storage.

Upon removal of the release paper, the adhesive tape composition can be used in a conventional manner such as by interposing it between the overlapping edges of adjacent roofing membranes to form a conventional roofing seam. The overlapping edges of the roofing membranes can be cleaned with soap and water or the appropriate solvent to remove any grease, oil or other contaminants which could interfere with providing an adequate seal, and/or may be primed as desired, to enhance bond formation and increase peel strength, although no primer is actually necessary to use the adhesive tape composition of the present invention. Typical solvents used for cleaning the edges of the roofing membrane include hexane, heptane or toluene, however, solvent cleaning is generally not required. Where a primer is used, one example suitable for use with this invention is Firestone's "QuickPrime®". Peel adhesion, seam shear strength, and static or dead-load shear strength are maximized by priming the overlapped edges of the two flat rubber sheets prior to forming the seam.

More specifically, the present invention is practiced by utilizing the adhesive tape between the sheets of EPDM or other types of polymeric roof sheeting materials noted herein. Once the first sheet is unrolled over the roof structure in an otherwise conventional fashion, the adhesive tape is applied to the edges of the sheet material at the seam area. Of course, the edges can be treated with a solvent and primed before applying the adhesive tape to the seam area, if needed. The next sheet is then applied onto the roof, overlapping the adhesive tape to form a laminate seam. The width of the seam can vary depending upon the requirements specified by the installer, contractor or architect, and therefore, does not constitute a limitation of the present invention. As noted hereinabove, seam widths typically vary between 1 and 5 inches, but may be wider. It will be appreciated that this practice of joining together roof sheeting membranes will eventually enable the installer to cover an entire roof.

The sheet materials to be joined together should preferably have a seam peel adhesion value of at least about 2 pounds/inch and a seam shear adhesion value of at least about 10 pounds/square inch, after aging for at least 24 hours and testing at 23° C.

In order to demonstrate the practice of this invention, seven sample adhesive tape compositions, listed in Table I, were prepared. Sample 1 is a control, 100 percent EPDM tape composition which is known in the art. Sample 2 is also a control and provides an example of a tape composition comprising a polymer blend of 83 parts by weight EPDM and 17 parts by weight of an ethylene-propylene copolymer. The art with respect to this composition was advanced in U.S. Ser. No. 08/330,041, the parent application to this application. It will be appreciated that said copolymer provides more surface tack, better "quick-grab", and higher green strength as compared to adhesive tape compositions such as Sample 1 containing 100 percent EPDM terpolymer.

Samples 3–7 were prepared in accordance with the present invention, and seams were formed by bonding together two layers of conventional EPDM sheet material with the adhesive tape compositions. The adhesive tape compositions and seams were then subjected to tack testing, peel adhesion testing, and dead-weight shear testing. The adhesive tape compositions exemplified hereinbelow are submitted for the purposes of further illustrating the nature of the present invention and are not to be considered as a limitation on the scope thereof.

The sample adhesive tape compositions employed for the tests are shown in Table I hereinbelow.

TABLE I

ADHESIVE TAPE FORMULATIONS

| Ingredients | Sample Nos. (amounts are in phr) | | | | | | |
|---|---|---|---|---|---|---|---|
| | 1 (control) | 2 (control) | 3 | 4 | 5 | 6 | 7 |
| EPDM[a] | 100 | 83 | 83 | 83 | 83 | 83 | 83 |
| Ethylene - Propylene copolymer[b] | | 17 | | | | | |
| Propylene-Butene-Ethylene terpolymer[c] | | | 17 | | | | |
| Ethylene-Butene copolymer[d] | | | | 17 | | | |

TABLE I-continued

ADHESIVE TAPE FORMULATIONS

| | Sample Nos. (amounts are in phr) | | | | | | |
|---|---|---|---|---|---|---|---|
| Ingredients | 1 (control) | 2 (control) | 3 | 4 | 5 | 6 | 7 |
| Ethylene-Vinyl Acetate[e] | | | | | 17 | | |
| Styrene-Butadiene-Styrene copolymer[f] | | | | | | 17 | |
| Polyisobutylene[g] | | | | | | | 17 |
| Polybutene[h] | 140 | 140 | 140 | 140 | 140 | 140 | 140 |
| Antioxidant (octylated diphenylamine)[i] | 0.41 | 0.41 | 0.41 | 0.41 | 0.41 | 0.41 | 0.41 |
| Carbon Black (N-650) | 4.15 | 4.15 | 4.15 | 4.15 | 4.15 | 4.15 | 4.15 |
| Zinc Oxide | 4.15 | 4.15 | 4.15 | 4.15 | 4.15 | 4.15 | 4.15 |
| Stearic Acid | 0.83 | 0.83 | 0.83 | 0.83 | 0.83 | 0.83 | 0.83 |
| Phenolic Resin[j] | 24.9 | 24.9 | 24.9 | 24.9 | 24.9 | 24.9 | 24.9 |
| Magnesium Silicate | 16.6 | 16.6 | 16.6 | 16.6 | 16.6 | 16.6 | 16.6 |
| Sulfur | 1.13 | 1.13 | 1.13 | 1.13 | 1.13 | 1.13 | 1.13 |
| DPTH Accelerator | 0.94 | 0.94 | 0.94 | 0.94 | 0.94 | 0.94 | 0.94 |
| TBBS Accelerator | 0.63 | 0.63 | 0.63 | 0.63 | 0.63 | 0.63 | 0.63 |
| Cure Activator[k] | 0.52 | 0.52 | 0.52 | 0.52 | 0.52 | 0.52 | 0.52 |
| TOTAL | 294.26 | 294.26 | 294.26 | 294.26 | 294.26 | 294.26 | 294.26 |

[a]Keltan 4906
[b]Vistalon 457
[c]Eastoflex 147
[d]Exact 4038
[e]Levapren 456
[f]Kraton G-1652
[g]Vistanex L-80
[h]Parapol 1300
[i]Agerite Stalite S
[j]Dyphene 8318
[k]Vulklor Each of the adhesive tape compositions were mixed in a Brabender mixer. The batch temperature was approximately 140° C. during preparation of the 300 gram masterbatch which was mixed in about 30 minutes. The sulfur/accelerator cure package was incorporated in the tape masterbatch at the end of the mixing process, after formation of the tape masterbatch at lower temperatures than previously employed, to prevent premature crosslinking of the polymers in the adhesive tape compositions.

Each of the prepared adhesive tape compositions was placed on a conventional release paper commercially available from Daubert Coated Products and compression molded for about 10 seconds at 100° C. to form a tape about 35 to 50 mils thick. The tapes were then at least partially cured in a forced air oven for about 8 hours at about 95° C. prior to being subjected to the various tests.

Probe tack testing was then done in accordance with ASTM D2979-88 using a Digital Polymer Probe Tack Tester (Model No. TMI 80-02-01, manufactured by Testing Machines Inc.). This is a device for measuring the tackiness of pressure sensitive adhesives, ink, paint and other materials. It has found wide application in the tape and adhesive industries for research and quality control. The dwell time for the probe tack test was about 1 to 2 seconds.

Each of the above tape compositions were also subjected to adhesion testing which necessitated the building of test pads comprising sheets of EPDM roofing material, according to the following procedure.

DETAILED PEEL AND SHEAR ADHESION TEST PROCEDURE

1. A number of uncleaned sheets of sulfur-cured, factory-produced, conventional black EPDM roofing membrane of approximately 45 mils in thickness were prepared and primed with a conventional solvent-based primer commercially available under the tradename "QuickPrime®". The primer was allowed to air dry at room temperature for at least 30 minutes before assembling the adhesion test pads.

2. Preparation of test samples in the shear configuration consisted of removing the release paper from a one-inch wide strip of adhesive tape and applying the tape directly along the edge of a piece of primer-coated membrane. After successfully mating the tape to the primer-coated membrane, the release paper was removed from the other side of the adhesive tape composition and firmly secured by hand to a second piece of primer-coated EPDM membrane. The peel adhesion test samples were prepared by removing the release paper from one side of a three-inch wide strip of adhesive tape and firmly securing the tape to the surface of a piece of EPDM membrane. After one side of the tape was successfully mated by hand to the primer-coated surface of a piece of EPDM membrane, the release paper on the other side of the three-inch wide strip of tape was removed and the tape was firmly secured by hand to a second piece of primer-coated EPDM sheeting.

3. Each test pad then was individually mated by rolling a 2.75-inch wide, 15 pound metal roller in a back and forth motion at least four times over the surface of the seam. The test pads were then aged an additional 30 minutes at room temperature.

4. A clicker machine with a one-inch wide die was utilized to prepare a number of test specimens for peel and shear adhesion testing. Test specimens prepared in the shear configuration were also tested in the static dead-load shear strength test.

5. The one-inch wide specimens were aged for 24 hours at either about 23° C. or about 70° C. prior to testing, and then either were tested at that same temperature or, in some test situations where specimens were aged at 70° C., were tested after being allowed to equilibrate at 23° C. for at least 30 minutes prior to testing.

6. The one-inch wide specimens were tested at the rate (both crosshead and chart speed) of two inches per minutes using the adhesion test method set forth in ASTM D-413 (machine method). Peel adhesion strength was determined at 70° C.

7. Peel adhesion strength is defined as:

peel adhesion strength (lbs./inch)=pounds force/sample width.

A static or dead-load shear strength test was also performed on each of the test samples. Such a test is useful for determining the creep resistance and green strength of an adhesive tape interposed between the overlapped edges of two flat rubber sheets. In this instance, the static or dead-load shear strength test was conducted to determine the creep resistance of the adhesive tape compositions.

As noted previously, the test samples for static or dead load shear strength testing were prepared using the shear configuration in accordance with the invention as depicted in the drawing figures, and one-inch wide shear adhesion test samples were prepared in accordance with the peel and shear adhesion test procedure detailed hereinabove. However, before placing the test specimens in the 70° C. forced air oven, both sides of each test sample were marked with a rubber marking pen at the seam step-off. This made it easier to note any slippage that occurred during the static dead-load shear strength test. After aging the one-inch wide specimens for 30 minutes, they were suspended in a vertical position in a 70° C. forced air oven. A 300 gram weight was applied to the unattached end of each dead-load specimen. After 24 hours of exposure at 70° C., the splice should not creep or slip more than ⅛ inch. Slippage of the seam in excess of ⅛ inch (about 3.17 mm) denotes a failure of the test.

The results of the various tests are shown in Table II hereinbelow.

sition (control) which contained 100 percent EPDM (Sample No. 1). It should be noted that tackier seam tape compositions will provide higher probe tack values. For example, in Table II, the blend of EPDM and Vistanex L-80 (polyisobutylene) would have more surface tack and better "quick-grab" which is essential during rooftop installation.

A static or dead-weight shear strength test was also conducted on each of the seven adhesive tape compositions listed in Table I. Such a test is useful for determining the strength of an adhesive tape composition interposed between the overlapped edges of two rubber sheets. In this situation, a static or dead-weight shear strength test was performed to determine the creep resistance of the adhesive tape compositions. The test was conducted as set forth hereinabove, and based upon the 24-hour dead-weight shear test results shown in Table II, at least four of the six composition blends of EPDM and an adhesive-enhancing polymer provided better results than that 100 percent EPDM control composition. The best resistance to creep on the 24-hour test was obtained with either an EPDM/Eastoflex® 147 polymer blend or a blend of EPDM and Exact® 4038. Seams that pass the dead-weight shear test are deemed to have good creep resistance.

Peel adhesion test data is also shown in Table II. For the 100 percent EPDM control composition (Sample No. 1), aging the composition for one and seven days at 70° C. and testing at 70° C. resulted in peel adhesion values of about 2.6 and 1.1 pounds per linear inch, respectively. The adhesive tape composition of the present invention generally showed peel adhesion values comparable to or directionally better than those values of the 100 percent EPDM control composition using the same aging times and aging temperature. With respect to Sample Nos. 4 and 5 in Table II, it can be said that seams that improve upon aging at elevated temperature for extended periods of time (i.e., from one to seven days) are deemed to have good resistance to heat aging. The 100 percent EPDM control composition did not show an improvement in peel adhesion performance when aged at 70° C. for extended periods of time. All of the peel adhesion

TABLE II

TACK AND ADHESION PROPERTIES OF ADHESIVE TAPE COMPOSITIONS[a]

| | Sample No. | | | | | | |
|---|---|---|---|---|---|---|---|
| | 1 | 2 | 3 | 4 | 5 | 6 | 7 |
| Probe Tack (1 sec-1 cm/sec) (g/cm2) @ 70° C. | 303 | 354 | 374 | 263 | 334 | 304 | 391 |
| Dead-Weight Shear (300 g @ 70° C.) | 2 pass (5 mm slip) 2 fail | 4 pass (3 mm slip) | 4 pass (2 mm slip) | 4 pass (2 mm slip) | 4 pass (4 mm slip)[b] | 1 pass (3 mm slip) 3 fail | 4 fail |
| Peel Adhesion @ 70° C. | | | | | | | |
| aged 1 day @ 70° C. (pounds/inch) | 2.6 (A) | 2.1 (A) | 1.6 (A). | 2.7 (A) | 2.6 (A) | 2.0 (A) | 0.5 (A) |
| aged 7 days @ 70° C. (pounds/inch) | 1.1 (A) | 2.1 (A) | 0.6 (A) | 1.5 (A) | 3.6 (A) | 1.0 (A) | 0.7 (A) |

(A) Adhesive Failure - separation occurred between the layer of primer and EPDM membrane.
[a]Oven cured 8 hours @ 95° C.
[b]Oven cured 24 hours @ 95° C.

Probe tack data shown in Table II supports the concept that EPDM blended with an adhesive-enhancing polymer, e.g., Eastoflex® 147 (propylene-butene-ethylene terpolymer), Levapren® 456 (ethylene vinyl acetate) and Vistanex L-80 (polyisobutylene) demonstrated a higher level of surface tack compared to the adhesive tape compotest failures in Table II involved separations between the layer of primer and the black EPDM membrane. The adhesion results provided hereinabove demonstrated that the use of adhesive tape compositions comprising a polymer blend of EPDM and an adhesive-enhancing polymer are sufficient to form acceptable adhesive tapes for use in forming seams to bond EPDM rubber roofing membranes or sheets together for the purpose of covering roofs.

Thus it should be evident that the adhesive tape compositions and related methods of the present invention are highly effective in joining together rubber roof sheeting membranes. This invention is particularly suitable for use with EPDM rubber sheeting for covering roofs, but is not necessarily limited thereto. For example, the tape compositions and method of the present invention can be used to join together other rubber articles such as protective liners, agricultural pond liners, fabric-reinforced liners, sheets for use in the building and construction industry as laminates for clean sheet and flashing and to secure other building accessories such as walkway pads, pipe boots, deck plates, T-joint covers and the like.

Furthermore, as noted hereinabove, the application of a primer, while used in the foregoing examples, is not necessary. However, the application of the primer eliminates the need to wash or scrub the overlapped edges of the flat rubber sheets with a suitable cleaning solution prior to application of the preformed adhesive tape.

Based upon the foregoing disclosure, it should now be apparent that the use of the adhesive tape composition described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the fillers and tackifying additives provided according to the present invention are not necessarily limited to those described in the illustrative examples. Moreover, as noted hereinabove, other means for mixing can be substituted for the Brabender mixer used to mix the tape masterbatch. The adhesive tape composition of this invention can be used to produce seam joints exhibiting excellent peel adhesion and shear strengths, and creep resistance. The adhesive composition of this invention should demonstrate good weathering resistance, moisture and heat aging resistance, and low temperature properties as compared to adhesive tape compositions containing butyl rubber. The adhesive tape composition of this invention provides more surface tack, better "quick-grab", and higher green strength as compared to adhesive tape compositions containing 100 percent EPDM rubber. Thus, the scope of the invention shall include all modifications and variations that may fall within the scope of the attached claims.

What is claimed is:

1. An adhesive tape composition for adhering together the overlapped edges of two layers of rubber sheeting, the adhesive tape composition comprising:
   a polymer blend consisting essentially of at least one ethylene-propylene-diene terpolymer and at least one fully saturated adhesive-enhancing polymer selected from the group consisting of ethylene-containing copolymers and terpolymers, hydrogenated styrene-containing copolymers, t-polyoctenamer rubber, polyisobutylene, and mixtures thereof, miscible with said at least one ethylene-propylene-diene terpolymer, wherein miscibility is determined by said adhesive-enhancing polymer being at least partially soluble in cyclohexane at a temperature of about 70° C. and in cyclohexane at a temperature of about 25° C.;
   at least one tackifying additive compatible with said polymer blend selected from the group consisting of polybutenes, paraffinic oils, petrolatum, phthalates, hydrocarbon and phenolic resins and mixtures thereof; and
   a cure package containing sulfur and at least one sulfur curing accelerator, for said polymer blend, said adhesive composition being devoid of butyl rubber.

2. An adhesive tape composition, as set forth in claim 1, wherein said polymer blend includes from about 50 to about 90 parts by weight of said at least one ethylene-propylene-diene terpolymer and from about 10 to about 50 parts by weight of said at least adhesive-enhancing polymer, to total 100 parts by weight of said polymer blend.

3. An adhesive tape composition, as set forth in claim 1, wherein said ethylene-containing copolymers and terpolymers are selected from the group consisting of ethylene-vinyl acetate copolymers, ethylene-vinyl chloride copolymers, ethylene-octene copolymers, ethylene-butene copolymers, and propylene-butene-ethylene terpolymers.

4. An adhesive tape composition, as set forth in claim 1, wherein said hydrogenated styrene-containing copolymers are selected from the group consisting of hydrogenated styrene-butadiene-styrene copolymers and hydrogenated styrene-isoprene-styrene copolymers.

5. An adhesive tape composition, as set forth in claim 1, wherein said t-polyoctenamer rubber is a mixture of cis- and trans-cyclooctene.

6. An adhesive tape composition, as set forth in claim 1, wherein said polymer blend includes more than one ethylene-propylene-diene terpolymer, each of said ethylene-propylene-diene terpolymers having a weight average molecular weight of up to about 350,000.

7. An adhesive tape composition, as set forth in claim 2, wherein said composition includes from about 50 to about 250 parts by weight tackifying additive, per 100 parts by weight of the polymer blend.

8. An adhesive tape composition, as set forth in claim 2, wherein said composition includes from about 1.25 to about 10 parts by weight curing agent and accelerator, per 100 parts by weight of the polymer blend.

9. An adhesive tape composition, as set forth in claim 1, further comprising a filler.

10. An adhesive tape composition for adhering together layers of polymeric sheet material, said adhesive tape composition comprising:
   a polymer blend consisting essentially of
      from about 50 to about 90 parts by weight of at least one ethylene-propylene-diene terpolymer; and
      from about 10 to about 50 parts by weight of at least one fully saturated adhesive-enhancing polymer selected from the group consisting of ethylene-containing copolymers and terpolymers, hydrogenated styrene containing copolymers, t-polyoctenamer rubber, polyisobutylene, and mixtures thereof, miscible with said at least one ethylene-propylene-diene terpolymer, to total 100 parts by weight of the polymer blend, wherein miscibility is determined by said adhesive-enhancing polymer being at least partially soluble in cyclohexane at a temperature of about 70° C. and in cyclohexane at a temperature of about 25° C.;
   from about 50 to about 250 parts by weight of at least one tackifying additive compatible with said polymer blend, per 100 parts by weight of said polymer blend, selected from the group consisting of polybutenes, paraffinic oils, petrolatum, phthalates, hydrocarbon and phenolic resins and mixtures thereof; and from about 1.25 to about 10 parts by weight of a cure package containing sulfur and at least one sulfur curing accelerator for said polymer blend, per 100 parts by weight of said polymer blend.

11. An adhesive tape composition, as set forth in claim 10, wherein said ethylene-containing copolymers and terpolymers are selected from the group consisting of ethylene-vinyl acetate copolymers, ethylene-vinyl chloride copolymers, ethylene-octene copolymers, ethylene-butene copolymers, and propylene-butene-ethylene terpolymers.

12. An adhesive tape composition, as set forth in claim 10, wherein said hydrogenated styrene-containing copolymers are selected from the group consisting of hydrogenated styrene-butadiene-styrene copolymers and hydrogenated styrene-isoprene-styrene copolymers.

13. An adhesive tape composition, as set forth in claim 10, wherein said t-polyoctenamer rubber is a mixture of cis- and trans-cyclooctene.

14. An adhesive tape composition, as set forth in claim 10, wherein said polymer blend includes more than one ethylene-propylene-diene terpolymer, each of said ethylene-propylene-diene terpolymers having a weight average molecular weight less than about 350,000.

15. An adhesive tape composition, as set forth in claim 10, further comprising from about 4 to about 35 parts by weight of a filler, per 100 parts by weight of said polymer blend.

* * * * *